Feb. 6, 1962 R. H. AYMAR ET AL 3,019,810
FOOT CONTROL VALVE DEVICE
Filed Aug. 21, 1959

INVENTORS
Robert H. Aymar &
Earl R. Weiner

BY Karl W. Flocks
ATTORNEY

3,019,810
Patented Feb. 6, 1962

3,019,810
FOOT CONTROL VALVE DEVICE
Robert H. Aymar, Prince Georges County, and Earl R. Weiner, Baltimore, Md., assignors to We-Mar, Inc., Baltimore, Md., a corporation of Maryland
Filed Aug. 21, 1959, Ser. No. 835,292
6 Claims. (Cl. 137—495)

The present invention relates to a foot control valve device and more particularly to such a device in which a precision valve is supported in a floor mounted housing.

The utilization of a foot operated pedal to control a valve has been proposed for various applications where the hands of a person are necessarily engaged in other work. Thus, the foot control valves have gained wide acceptance, and many such valves have been heretofore proposed.

While these valves have in general been satisfactory in performing their overall functions many of them have not been as economical as desirable. This has come about because of the fact that the operative parts of the valve, the seat and the valve member, and other attendant members, have all been incorporated in a housing. These housings have often been either of cast metal or of sheet metal as constituent parts thereof, and in either event it has been necessary to perform relatively high precision workmanship throughout the entire manufacturing process.

Other foot operated valves have not been as utilitarian as desirable, since they have in many instances required that they be secured or bolted to the floor, or otherwise structurally connected with a static fixture.

While there has previously been proposed a construction in which a valve housing could be mounted on a separate housing support, such a construction has not proven entirely satisfactory as the valve housing was not protected from being struck by extraneous objects, such as vehicles or dropped articles, as may occur in certain shop and laboratory installations. In addition, this foot operated valve was of a complicated configuration having extending side flanges which were apt to trip persons passing thereby or to engage with the wheels of carts or similar vehicles used in the shop or laboratory.

An object of the present invention is to provide a foot operated valve device that is of extremely economical construction.

Another object of the present invention is the provision of a foot operated device that is configured so as to avoid being accidentally engaged by passing persons or small vehicles.

Yet another object of the present invention is to provide a foot control valve device in which the valve itself is protected from engagement and damage by extraneous objects.

Still another object of the present invention is to provide a foot operated valve device that does not require means to fasten it to the floor, and which will not be liable to being accidentally upset.

A further object of the invention is to provide a foot controlled fluid pressure control device including pressure responsive means affording "feel" characteristics proportional to the fluid pressure being controlled.

Other objects and the nature and advantages of the instant invention will be apparent from the following description taken in conjunction with the accompanying drawings, wherein.

Figure 1:
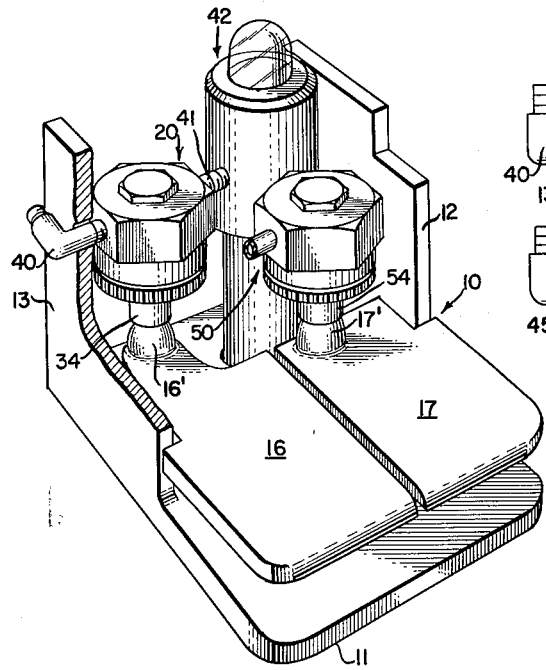
FIG. 1 is a perspective view, with parts broken away, of a foot control device in accordance with the present invention.
Figure 2:
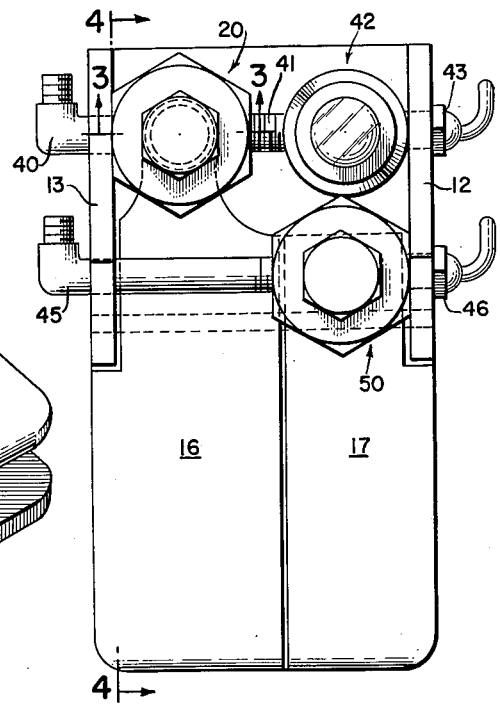
FIG. 2 is a plan view of the device of FIG. 1.

Referring now to the drawings, wherein like reference numerals are used to designate like or corresponding parts throughout the several views, there is shown in FIG. 1 a foot operated valve device 10 comprising a generally elongated planar base 11. Base 11 is made of a relatively heavy (high specific gravity) material, such as iron, and is preferably of generally rectangular shape. A pair of spaced ears 12 and 13 extend upwardly from opposite sides of base 11, adjacent the rear thereof. The ears 12 and 13 are of substantially the same size and shape. Thus, the ears 12 and 13 may be seen to be similar, and they are preferably integral with base plate 11.

A pair of pedals 16 and 17 are positioned above the base plate 11, and these pedals 16 and 17 have the front parts thereof in overlying registering relationship with the front part of base 11.

Figure 4:
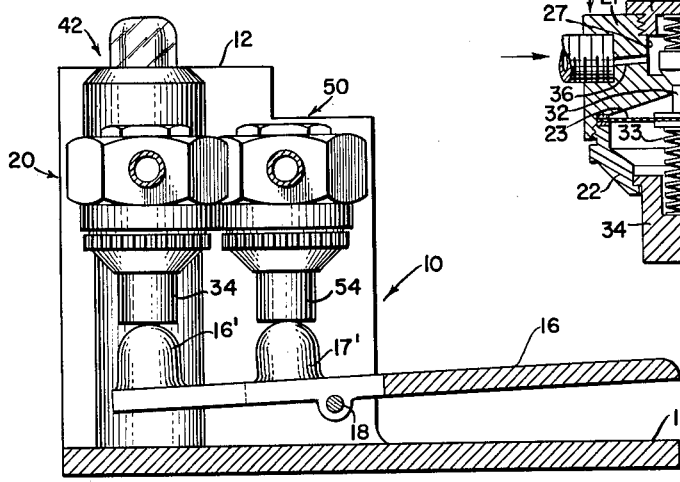
FIG. 4 is a cross sectional view taken on the line 4—4 of FIG. 2.

The pedals 16 and 17 extend between the upstanding ears 12 and 13, and as may be seen from FIG. 4, are pivotally mounted to the ears 12 and 13 by a pivot pin 18 extending through the pedals 16 and 17 and into the ears 12 and 13.

Figure 3:
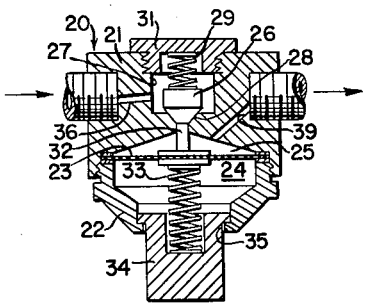
FIG. 3 is an enlarged cross sectional view taken on the line 3—3 of FIG. 2.

A valve 20 is mounted between the ears 12 and 13, the valve 20 comprising, as may be seen in FIG. 3, an upper body 21 and the lower body 22, the bodies 21 and 22 being threadedly connected to each other and clamping between them a diaphragm 23 to thus provide a lower chamber 24 and an upper chamber 25. An element 26 is positioned in a chamber 27 in upper body 21, engaging with a valve seat 28 formed in upper body 21. The element 26 is subjected to the force of a spring 29 that may be adjusted by screw 31.

Integral with element 26 is a stem 32 that engages with the diaphragm 23, there being a spring 33 opposite the stem 32. Spring 33 is received in the cup of a valve operator 34 that is slidable in a bore 35 of lower body 22.

An inlet passage 36 leads into chamber 27 and an outlet passage 39 leads from the chamber 25. As will be understood, element 26 is a regulating means and controls the flow of fluid between chambers 25 and 27.

It will be observed in FIG. 3 that the valve element 26 is disclosed in a closing position on its seat 28. In this position the chamber 27 is subject to line pressure and the chamber 25 of which the diaphragm 23 forms one side, is subject to atmospheric pressure. The springs 29 and 33 react against each other and are proportioned accordingly. The surface of the diaphragm 23 forming the one side of the chamber 25 is not subject to any pressure in the position shown. When an operator applies an upward force on the pedal 16, for example, the element 16' will engage the operator 34 and the valve element 26 will be raised from its seat 28 and fluid pressure will be metered from chamber 27 into chamber 25. At the same time the fluid pressure being metered will react on the diaphragm 23 to provide a reactive force through the spring 33, operator 34 and pedal 16 to provide a reactive force against the operator's foot. Thus, the valve provides "feel" characteristics which will permit the operator to have full control over the amount of fluid pressure being metered into chamber 25.

The valve 20 is supported by conduits which extend through the ears 12 and 13, there being shown in FIG. 1 a conduit 40 which is an inlet conduit. The outlet passage 37 of the valve 20 is connected by a rigid conduit 41 with an oiling device generally designated 42, the oiling device 42 being supported by conduit 41 and a conduit 43 that extends through ear 12.

A second valve 50 which may be generally of the same construction as the valve 20 is supported between the ears 12 and 13 by a supporting conduit 45 that extends through the ear 13 and a supporting conduit 46 that extends through the ear 12. Both of the valves 20 and 50 are entirely contained within an envelope that is defined by the ears 12 and 13.

The rear end of foot pedal 16 has an upstanding domed protrusion 16' that engages with the valve operator 34 of valve 20 and the foot pedal 17 has an upstanding domed protrusion 17' that engages with a valve operator 54 that extends downwardly from the valve 50.

In the use of the foot control valve device 10, the device is placed on a floor with the underside of planar base 11 in engagement with and resting upon the floor. Due to the large mass of the base plate 11, and its particular relation to the other masses of the device 10, the device 10 will have an extremely low center of gravity, as will be readily appreciated from the showing in FIG. 4. These factors provide an extremely stable valve device which cannot readily be upset so as to cause accidental opening of the valves 20 and 50 or damage to any of the parts of the device 10. Due to the placement of the valves 20 and 50 between the ears 12 and 13 and within the envelope defined thereby, the possibility of foreign objects striking the valves 20 and 50 and inflicting damage to them or to their supporting conduits is largely precluded. The valve device 10 requires a minimum of floor area, has no extending flanges or parts that can trip a person passing by or interfere with a cart or vehicle.

Because the valve 20, for example, may be made entirely separately from the base 11, ears 12 and 13 and pedals 16 and 17, it may be manufactured with the necessary quality of workmanship, while the base 11, ears 12 and 13, and pedals 16 and 17 may be manufactured using a much lower grade of material and level of workmanship. Hence, only the valves themselves are expensive, and the entire operating and housing structures may be made economically, thus permitting the production of the entire device 10 at a minimum of cost.

It will be obvious to those skilled in the art that various changes may be made without departing from the spirit of the invention and therefore the invention is not limited to what is shown in the drawings and described in the specification but only as indicated in the appended claims.

We claim:

1. A foot controlled valve device comprising a generally rectangular planar base of relatively high specific gravity, a pair of spaced similar ears integral with said base and extending upwardly from opposite sides thereof adjacent the rear thereof, pedal means overlying the front part of said base and extending between said ears, means pivotally mounting said pedal means between said ears intermediate the ends thereof for rocking motion, a valve body including a valve element and an upwardly movable valve operator extending therebeneath, supporting conduit means extending through said ears and connected with said valve body, said supporting conduit means mounting said valve body between said ears with the valve body being entirely within an envelope defined by said ears and the valve operator operatively overlying the part of said pedal that extends between said ears, said valve body including opposed chambers between which said valve element is disposed, said conduit means including portions respectively communicating with one of said chambers for directing fluid pressure therebetween, and fluid pressure responsive means connected to said valve element and subject to pressures controlled thereby for providing a reactive force on said pedal means through said valve operator.

2. A foot controlled valve device comprising a generally elongated planar base of relatively high specific gravity, a pair of spaced similar ears integral with said base and extending upwardly from opposite sides thereof adjacent the rear thereof, pedal means overlying the front part of said base and extending between said ears, means pivotally mounting said pedal means between said ears intermediate the ends thereof for rocking motion, a valve body including a valve element and an upwardly movable valve operator extending therebeneath, support means extending through said ears and connected with said valve body, said support means mounting said valve body between said ears with the valve body being entirely within an envelope defined by said ears and the valve operator operatively overlying the part of said pedal that extends between said ears, a fluid pressure responsive means in said valve body and operatively connected to said valve operator and said valve element for providing a reactive force on said pedal means.

3. A foot controlled valve device comprising a generally planar base of relatively high specific gravity, a pair of spaced ears extending upwardly from opposite sides of said base adjacent the rear thereof, pedal means overlying the front part of said base and extending between said ears, means pivotally mounting said pedal means between said ears intermediate the ends thereof for rocking motion, a valve body including a valve element and an upwardly movable valve operator extending therebeneath, support means extending through said ears and connected with said valve body, said support means mounting said valve body between said ears with the valve operator operatively overlying the part of said pedal that extends between said ears, and fluid pressure responsive means in said valve body and connected to said valve element, said fluid pressure responsive means being subject to pressures controlled by said valve element for transmitting a reactive force to said pedal.

4. The structure of claim 3, said fluid pressure responsive means comprising a flexible diaphragm, said valve element including a stem portion fixedly connected to said diaphragm.

5. The structure of claim 4, said valve body including opposed spring means reacting in opposite directions on said valve element and diaphragm.

6. A foot controlled valve device comprising a generally elongated planar base plate of relatively high specific gravity, a pair of spaced similar ears integral with said base and extending upwardly from opposite sides thereof adjacent the rear thereof, pedal means in overlying registry with the front part of said base plate and extending between said ears, means pivotally mounting said pedal means between said ears intermediate the ends thereof for rocking motion, a valve comprising a valve body and an upwardly movable slidable valve operator extending therebeneath, supporting conduit means extending through said ears and communicating fluid pressure to said valve body, said supporting conduit means mounting said valve between said ears with the valve body being entirely within an envelope defined by said ears and the valve operator operatively overlying the part of said pedal that extends between said ears.

References Cited in the file of this patent

UNITED STATES PATENTS

| 346,141 | Bayrer | July 27, 1886 |
| 2,693,716 | Ludwig | Nov. 9, 1954 |
| 2,887,122 | Chapman | May 19, 1959 |

FOREIGN PATENTS

| 744,984 | Germany | Feb. 4, 1942 |
| 348,790 | Italy | of 1937 |